United States Patent
Koskimies et al.

(10) Patent No.: US 11,200,307 B2
(45) Date of Patent: Dec. 14, 2021

(54) ACCESS MANAGEMENT

(71) Applicant: Nokia Technologies Oy, Espoo (FI)

(72) Inventors: Olli Oskari Koskimies, Helsinki (FI); Timo Tapani Mikola, Tampere (FI); Lioudmila Lucy Blants, Espoo (FI)

(73) Assignee: Nokia Technologies Oy, Espoo (FI)

(*) Notice: Subject to any disclaimer, the term of this patent is extended or adjusted under 35 U.S.C. 154(b) by 236 days.

(21) Appl. No.: 15/777,807

(22) PCT Filed: Dec. 3, 2015

(86) PCT No.: PCT/FI2015/050852
§ 371 (c)(1),
(2) Date: May 21, 2018

(87) PCT Pub. No.: WO2017/093597
PCT Pub. Date: Jun. 8, 2017

(65) Prior Publication Data
US 2018/0375849 A1    Dec. 27, 2018

(51) Int. Cl.
*G06F 21/33* (2013.01)
*G07C 9/00* (2020.01)
(Continued)

(52) U.S. Cl.
CPC ........... *G06F 21/335* (2013.01); *G06F 21/45* (2013.01); *G07C 9/00* (2013.01); *H04L 9/0863* (2013.01);
(Continued)

(58) Field of Classification Search
CPC ..... H04L 63/083; H04L 12/08; H04L 9/3234; H04L 9/3297; H04L 9/3228;
(Continued)

(56) References Cited

U.S. PATENT DOCUMENTS 7,114,178 B2 * 9/2006 Dent ..................... H04L 9/3271
726/6
8,042,163 B1 * 10/2011 Karr ....................... G06F 3/062
713/164

(Continued)

FOREIGN PATENT DOCUMENTS

CN    101641892 A    2/2010
EP      1450312 A2 *  8/2004    ......... G07C 9/00103

(Continued)

OTHER PUBLICATIONS

IP.com Search History, Mar. 5, 2020 (Year: 2020).*
(Continued)

*Primary Examiner* — Samson B Lemma
*Assistant Examiner* — Blake I Narramore
(74) *Attorney, Agent, or Firm* — Laine IP Oy

(57) ABSTRACT

According to an example aspect of the present invention, there is provided an apparatus comprising a memory configured to store an encryption key and a list of access tokens and at least one processing core configured to select a first access token from the list of access tokens based, at least partly, on at least one of a current time and a sequence number, decide, based at least partly on the first access token, whether to grant a user device access to the apparatus, and cause the apparatus to receive a second list of access tokens from at least one of the user device and a second user device.

17 Claims, 6 Drawing Sheets

(51) Int. Cl.
  *G06F 21/45* (2013.01)
  *H04L 9/32* (2006.01)
  *H04L 12/08* (2006.01)
  *H04W 4/80* (2018.01)
  *H04W 12/61* (2021.01)
  *H04W 12/084* (2021.01)
  *H04L 9/08* (2006.01)
  *H04L 29/06* (2006.01)

(52) U.S. Cl.
  CPC .......... *H04L 9/3228* (2013.01); *H04L 9/3234* (2013.01); *H04L 9/3297* (2013.01); *H04L 12/08* (2013.01); *H04L 63/083* (2013.01); *H04W 4/80* (2018.02); *H04W 12/084* (2021.01); *H04W 12/61* (2021.01); *G06F 2221/2109* (2013.01); *H04L 2209/80* (2013.01); *H04L 2209/805* (2013.01)

(58) Field of Classification Search
  CPC ............. H04L 9/0863; H04L 2209/805; H04L 2209/80; H04W 4/80; H04W 12/00502; H04W 12/08; G06F 21/45; G06F 21/335; G06F 2221/2109; G07C 9/00
  See application file for complete search history.

(56) References Cited

U.S. PATENT DOCUMENTS

| | | | | |
|---|---|---|---|---|
| 8,307,210 | B1* | 11/2012 | Duane | H04L 9/0897 713/172 |
| 8,387,137 | B2 | 2/2013 | Lee et al. | |
| 8,584,218 | B2 | 11/2013 | Peterson et al. | |
| 8,683,562 | B2 | 3/2014 | Ting et al. | |
| 8,689,294 | B1 | 4/2014 | Thakur et al. | |
| 8,793,784 | B2* | 7/2014 | Metivier | G07C 9/27 726/16 |
| 8,955,086 | B2 | 2/2015 | Pal | |
| 9,043,605 | B1 | 5/2015 | Machani | |
| 9,652,913 | B2* | 5/2017 | Drako | H04L 67/02 |
| 2002/0046342 | A1* | 4/2002 | Elteto | G06F 21/6263 713/185 |
| 2003/0110011 | A1* | 6/2003 | Kyotoku | G06F 21/123 702/186 |
| 2003/0156588 | A1* | 8/2003 | Elbourne | H04L 41/0896 370/395.41 |
| 2005/0166263 | A1 | 7/2005 | Nanopoulos et al. | |
| 2005/0283444 | A1* | 12/2005 | Ekberg | G07F 7/0886 705/67 |
| 2007/0140496 | A1* | 6/2007 | Phinney | H04L 9/0894 380/286 |
| 2008/0091680 | A1* | 4/2008 | Eshel | H04L 12/417 |
| 2009/0265555 | A1* | 10/2009 | Royer | G06F 21/32 713/168 |
| 2009/0268905 | A1* | 10/2009 | Matsushima | H04N 21/4627 380/200 |
| 2009/0300168 | A1* | 12/2009 | Guo | G06F 21/73 709/224 |
| 2013/0086645 | A1* | 4/2013 | Srinivasan | H04L 63/0815 726/4 |
| 2014/0013396 | A1* | 1/2014 | Field-Eliot | G06F 21/335 726/4 |
| 2014/0040993 | A1* | 2/2014 | Lorenzo | G06F 21/41 726/4 |
| 2014/0173695 | A1* | 6/2014 | Valdivia | G06F 21/36 726/4 |
| 2014/0245420 | A1* | 8/2014 | Tidwell | H04L 65/40 726/10 |
| 2015/0026774 | A1 | 1/2015 | Yang | |
| 2015/0089622 | A1* | 3/2015 | Sondhi | H04L 63/20 726/9 |
| 2015/0113621 | A1 | 4/2015 | Glickfield et al. | |
| 2015/0128254 | A1 | 5/2015 | Rao et al. | |
| 2015/0143498 | A1 | 5/2015 | Pal | |
| 2015/0181080 | A1* | 6/2015 | Nuggehalli | H04L 67/16 358/1.15 |
| 2016/0006705 | A1* | 1/2016 | Gupta | H04L 63/0428 713/168 |
| 2016/0028737 | A1* | 1/2016 | Srinivasan | H04L 63/102 726/1 |
| 2016/0150467 | A1* | 5/2016 | Shaw | H04W 12/08 370/329 |
| 2016/0154745 | A1* | 6/2016 | Nagai | G06F 1/3275 713/176 |
| 2016/0259941 | A1* | 9/2016 | Vasudevan | G06F 21/575 |
| 2016/0283737 | A1* | 9/2016 | Soman | H04L 9/3213 |
| 2016/0358391 | A1* | 12/2016 | Drako | H04L 67/02 |
| 2017/0155627 | A1* | 6/2017 | Goel | H04L 63/0815 |
| 2017/0374551 | A1* | 12/2017 | Shen | H04W 12/04 |
| 2018/0089916 | A1* | 3/2018 | Drako | G07C 9/00571 |

FOREIGN PATENT DOCUMENTS

| | | | | |
|---|---|---|---|---|
| EP | 1450312 | A2 | 8/2004 | |
| EP | 1833219 | A1 | 9/2007 | |
| EP | 2037651 | A1 | 3/2009 | |
| EP | 2434463 | A2 * | 3/2012 | ......... G07C 9/00182 |
| EP | 2434463 | A2 | 3/2012 | |

OTHER PUBLICATIONS

IP.com Search Query Sep. 9, 2020 (Year: 2020).*
Extended European Search Report received for corresponding European Patent Application No. 15909664.3, dated Jul. 12, 2019, 9 pages.
"Internet of Things", Wikipedia, Retrieved on May 9, 2018, Webpage available at : https://en.wikipedia.org/wiki/Internet_of_things.
Wu et al., "Selective Timestamp-Nonce Based Authentication Scheme", International Journal of Security and Its Applications, vol. 7, No. 1, Jan. 2013, pp. 95-104.
"Bluetooth Specification Version 4.2", Bluetooth, vol. 6, Dec. 2, 2014, pp. 1-192.
Falk et al., "Security Service for the Rollout of Security Credentials in Ubiquitous Industrial Automation Environments", The Second International Conferences on Advanced Service Computing, 2010, pp. 104-110.
International Search Report and Written Opinion received for corresponding Patent Cooperation Treaty Application No. PCT/FI2015/050852, dated Mar. 18, 2016, 12 pages.
Office action received for corresponding Chinese Patent Application No. 201580085017.4, dated Jan. 6, 2020, 18 pages of office action and no page of translation available.

* cited by examiner

ACCESS MANAGEMENT

RELATED APPLICATION

This application was originally filed as PCT Application No. PCT/FI2015/050852 filed Dec. 3, 2015.

FIELD

The present invention relates to the field of managing access to devices using access tokens.

BACKGROUND

When a user device attempts to access an apparatus that is access controlled, the user device may be requested to provide a credential to prove it, or the user, is authorized to access the apparatus. For example, where the apparatus being accessed is an electronic lock controller, the user device needs to be in possession of a key, which may comprise a cryptographic token, for example, to present to the apparatus to cause access to be granted.

A credential may be static, in that it remains constant over time, or the access controlled apparatus may be arranged to receive new credentials, for example periodically, over a fixed network connection. An advantage of changing credentials is that on case a single credential is compromised, an unauthorized party cannot gain permanent access to the access controlled device.

In an Internet of Things, IoT, setting, an access controlled apparatus may be arranged to periodically, or on request once credentials are used up, request for new credentials via a suitable fixed gateway, for example. Credentials may comprise access tokens, wherein a user device may be provided with an access token that matches an access token in the access controlled apparatus. For example, the access token may comprise a shared secret that is usable in establishing a cryptographic protocol connection between the user device and the access controlled apparatus. The access token may be usable in authenticating the user device and/or access controlled apparatus, for example.

Connections between user devices and access controlled apparatuses may be implemented as wire-line or wireless connections, such as, for example, universal serial bus, USB, connections, wireless local area network, WLAN, or Bluetooth connections, as is convenient and depending on the implementation in question.

Examples of access controlled devices may comprise, in addition to electronic lock controllers, laboratory equipment, medical equipment, cars, bicycles, motorcycles, personal appliances such as washing machines, industrial machinery, industrial process controllers, and commercial or residential machinery.

SUMMARY OF THE INVENTION

The invention is defined by the features of the independent claims. Some specific embodiments are defined in the dependent claims.

According to a first aspect of the present invention, there is provided an apparatus comprising a memory configured to store an encryption key and a list of access tokens and at least one processing core configured to select a first access token from the list of access tokens based, at least partly, on at least one of a current time and a sequence number, decide, based at least partly on the first access token, whether to grant a user device access to the apparatus, and cause the apparatus to receive a second list of access tokens from at least one of the user device and a second user device.

Various embodiments of the first aspect may comprise at least one feature from the following bulleted list:
- the at least one processing core is configured to cause the apparatus to receive the second list of access tokens over a short-range wireless interface
- the short-range wireless interface comprises a Bluetooth interface
- the memory is configured to store a plurality of lists of access tokens, each list of access tokens comprising access tokens that are usable in obtaining a different level of access to the apparatus
- each list corresponds to a distinct role a user may assume with respect to the apparatus
- the at least one processing core is configured to select the first access token based at least partly on the current time, each access token being associated with a validity time interval
- the at least one processing core is configured to select the first access token based at least partly on the sequence number by allowing each access token to be used a set number of times
- the at least one processing core is configured to select the first access token based at least partly on the sequence number, wherein each access token is enabled for a preconfigured time duration, after which the sequence number used is incremented
- the at least one processing core is configured to cause the apparatus to advertise at least one of the current time and the sequence number
- the at least one processing core is configured to cause the apparatus to decrypt the second list of access tokens, using the encryption key, and to authenticate the second list of access tokens based at least partly based on a result of the decrypting.

According to a second aspect of the present invention, there is provided an apparatus comprising at least one processing core, at least one memory including computer program code, the at least one memory and the computer program code being configured to, with the at least one processing core, cause the apparatus at least to obtain a list of access tokens, process information, the information comprising at least one of a sequence number and a current time indication, and select, based at least partly on the at least one of the sequence number and the current time indication, a first access token from the list of access tokens and establish a connection with a first device based at least partly on the first access token.

Various embodiments of the second aspect may comprise at least one feature from the following bulleted list:
- the at least one memory and the computer program code are configured to, with the at least one processing core, cause the apparatus to select the first access token based at least partly on the current time, each access token being associated with a validity time interval
- the at least one memory and the computer program code are configured to, with the at least one processing core, cause the apparatus to select the first access token based at least partly on the sequence number, each access token being allowed to be used a set number of times
- the at least one memory and the computer program code are configured to, with the at least one processing core, cause the apparatus to select the first access token based at least partly on the sequence number, wherein each access token is enabled for a preconfigured time duration, after which the sequence number used is incremented the at least one memory and the computer program code are configured to, with the at least one processing core, cause the apparatus to obtain a second list of access tokens, and to provide the second list of access tokens to the first device.

According to a third aspect of the present invention, there is provided a method comprising storing an encryption key and a list of access tokens, selecting a first access token from the list of access tokens based, at least partly, on at least one of a current time and a sequence number, deciding, based at least partly on the first access token, whether to grant a user device access to an apparatus, and causing the apparatus to receive a second list of access tokens from at least one of the user device and a second user device.

Various embodiments of the third aspect may comprise at least one feature corresponding to a feature from the preceding bulleted list laid out in connection with the first aspect.

According to a fourth aspect of the present invention, there is provided a method comprising obtaining a list of access tokens, processing information, the information comprising at least one of a sequence number and a current time indication, and selecting, based at least partly on the at least one of the sequence number and the current time indication, a first access token from the list of access tokens and establishing a connection with a first device based at least partly on the first access token.

Various embodiments of the fourth aspect may comprise at least one feature corresponding to a feature from the preceding bulleted list laid out in connection with the second aspect.

According to a fifth aspect of the present invention, there is provided an apparatus comprising means for storing an encryption key and a list of access tokens, means for selecting a first access token from the list of access tokens based, at least partly, on at least one of a current time and a sequence number, means for deciding, based at least partly on the first access token, whether to grant a user device access to an apparatus, and means for causing the apparatus to receive a second list of access tokens from at least one of the user device and a second user device.

According to a sixth aspect of the present invention, there is provided an apparatus comprising means for obtaining a list of access tokens, means for processing an advertisement originating in a first device, the advertisement comprising at least one of a sequence number and a current time indication, and means for selecting, based at least partly on the at least one of the sequence number and the current time indication, a first access token from the list of access tokens, and for establishing a connection with the first device based at least partly on the first access token.

According to a seventh aspect of the present invention, there is provided a non-transitory computer readable medium having stored thereon a set of computer readable instructions that, when executed by at least one processor, cause an apparatus to at least store an encryption key and a list of access tokens, select a first access token from the list of access tokens based, at least partly, on at least one of a current time and a sequence number, decide, based at least partly on the first access token, whether to grant a user device access to an apparatus, and cause the apparatus to receive a second list of access tokens from at least one of the user device and a second user device.

According to an eighth aspect of the present invention, there is provided a non-transitory computer readable medium having stored thereon a set of computer readable instructions that, when executed by at least one processor, cause an apparatus to at least obtain a list of access tokens, process an advertisement originating in a first device, the advertisement comprising at least one of a sequence number and a current time indication, and select, based at least partly on the at least one of the sequence number and the current time indication, a first access token from the list of access tokens and establish a connection with the first device based at least partly on the first access token.

According to a ninth aspect of the present invention, there is provided a computer program configured to cause a method in accordance with at least one of the second and third aspects to be performed.

EMBODIMENTS

By receiving access tokens from an access service via a user device, as opposed to via a gateway, an advantage may be obtained in that an access controlled device may be made simpler in that there may no longer be a need to equip the access controlled device with a distinct communications capability toward the gateway. Examples of access controlled devices and user devices are provided here in below.

Figure 1:
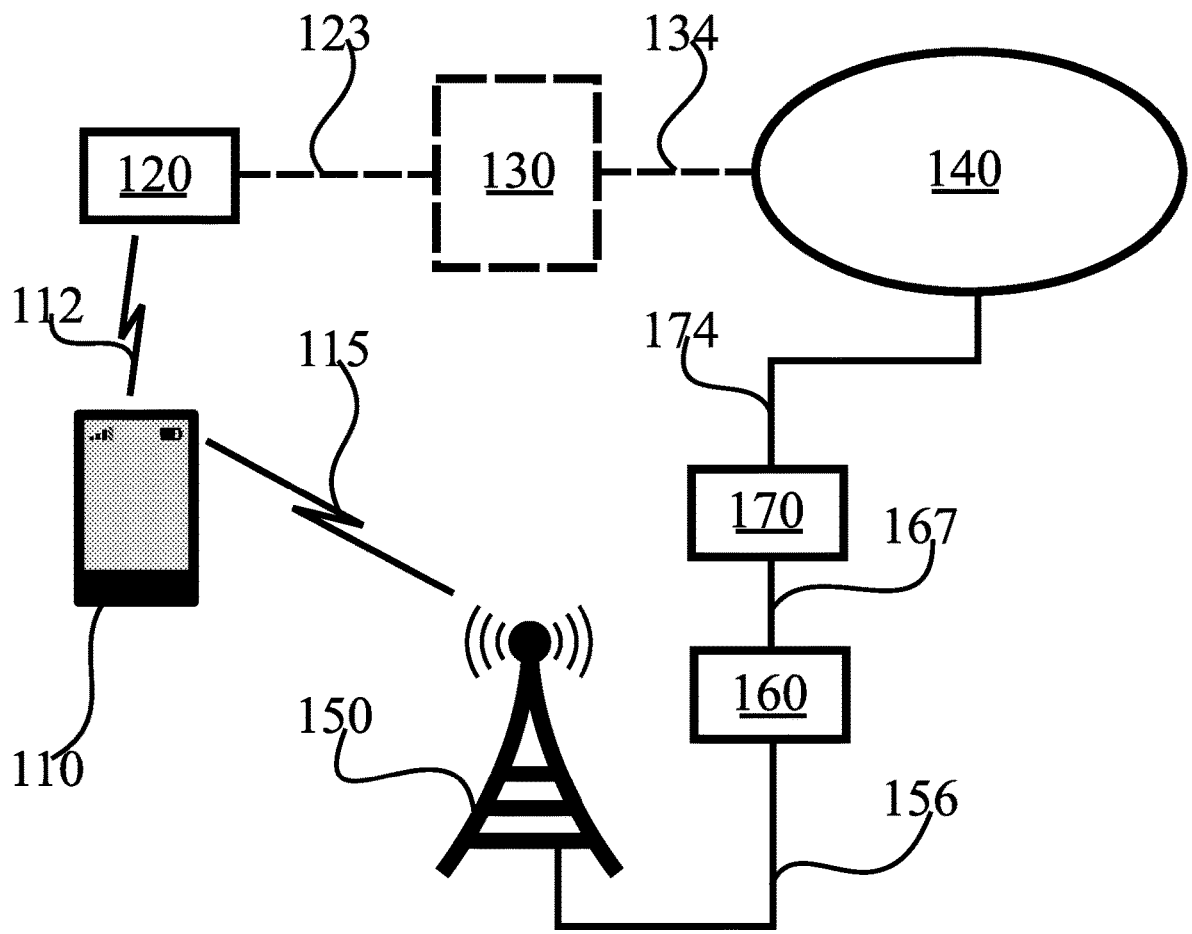
FIG. 1 illustrates a system in accordance with at least some embodiments of the present invention.

FIG. 1 illustrates a system in accordance with at least some embodiments of the present invention. The system comprises an access controlled device 120, which may comprise, for example, an IoT device or another kind of access controlled device, such as, for example, a medical patient information repository or controller thereof. Access controlled device 120 may comprise a processing core and memory, and may be powered by a stable power source or, for example, by a rechargeable battery. For example, access controlled device 120 may comprise a personal, wearable and/or embedded device. Access controlled device 120 may be configured to collect sensor data and/or actuate further devices, such as, for example, a door. Access controlled device 120 may be accessible in different roles, such that where access controlled device 120 comprises a patient information repository, for example, a doctor may have broader access to information contained therein than a nurse, with the nurse having narrower access. Broader access may comprise, for example, authority to modify treatment plans, while narrower access may comprise authority to view treatment plans. Access controlled device 120 may lack a fixed connection.

User device 110 may comprise, for example, a mobile phone, smartphone, tablet device, laptop computer or other suitable device. User device 110 may be used to access controlled device 120, for example via connection 112. Connection 112 may comprise a wire-line connection, or, as illustrated, a wireless connection. Connection 112 may comprise a USB, WLAN or Bluetooth connection, for example.

User device 110 may be configured to access access controlled device 120 via connection 112. Access controlled device 120 may be configured to verify user device 110 is authorized to access it, wherein such verifying may comprise employing cryptographic information. In general, such cryptographic information may be referred to as an access token. For successful verification, user device 110 and access controlled device 120 may, in some embodiments, be required to have matching access tokens. Matching access tokens may comprise the same cryptographic information, or cryptographic information that is not the same, but compatible. Where the cryptographic information is the same, it may comprise a shared secret. Where the cryptographic information is not the same, it may comprise, for example, a public key on the one hand and a private key on the other hand, of a public key-private key pair in a public key cryptographic system.

User device 110 may select an access token to use in dependence of information received in user device 110 from access controlled device 120. The information may be received from a broadcast sent by access controlled device 120, or by querying and responsively receiving the information, for example. A broadcast may comprise a transmission that is not addressed to any node in particular. A broadcast may be wireless, for example over a Bluetooth interface. A Bluetooth broadcast may comprise a Bluetooth advertising packet. Access controlled device 120 may select a corresponding access token, in accordance with the information. Alternatively to selecting access tokens based on information originating in access controlled device 120, both access controlled device 120 and user device 110 may select their access tokens based on information that is available to both devices. An example of such information available to both devices is a clock signal.

User device 110 may select an address for itself for communicating with access controlled device 120. For example, user device 110 may select a resolvable private device address so that a user device 110 identity perceived by the access controlled device is consistent with an encryption key used when communicating over connection 112. An example of such a key is an identity resolving key, which may be comprised in the access token used. A role user device 110 assumes toward access controlled device 120 may determine which access token, encryption key and thus address user device 110 takes into use toward access controlled device 120.

Access controlled device 120 may store lists of access tokens, each list comprising access tokens usable in accessing access controlled device 120 in a corresponding role. In other words, access controlled device 120 may have a first list of access tokens configured to grant a first kind of access, corresponding to a first role, and access controlled device 120 may have a second list of access tokens configured to grant a second kind of access, corresponding to a second role. In other words, when access controlled device 120 is accessed using an access token from the first list, access controlled device 120 may grant the first kind of access, corresponding to the first role. For example, a nurse may request access to a medical information store using an access token associated with a nurse role, and he would responsively be granted nurse-role access.

Access tokens may be configured to be usable for a finite number of times, and/or for a finite length of time. In case an access token was static, that is, permanent, then a stolen access token could be used to provide permanent unauthorised access to the access controlled device. Therefore changing the access tokens from time to time increases the security level of the access controlled device.

An access service 140, which may be disposed in a server or cloud service, for example, may be arranged to provide access tokens to user device 110. For example, access service 140 may provide access tokens to user device 110, the access tokens being arranged to provide an appropriate level of access to access controlled device 120. The appropriate level of access may correspond to a role that a user of user device 110 has, for example. Where user device 110 may have several users, these users may have different roles with respect to access controlled devices, and such a user device may be provided with appropriate access tokens to enable such use by plural users in plural roles. User device 110 may communicate with access service 140 via wireless link 115, base station 150, connection 156, controller 160, connection 167, gateway 170 and connection 174, for example. Wireless link 115 and base station 150 may be arranged to operate in accordance with a suitable cellular or non-cellular technology. Examples of cellular technology include long term evolution, LTE, and wireless code division multiple access, WCDMA. Examples of non-cellular technologies include WLAN and worldwide interoperability for microwave access, WiMAX. Alternatively, user device 110 may be configured to communicate with access service 140 more directly, for example, via a touch interaction with a server. Near-field communication, NFC, may provide touch interaction-based communication. User device 110 may be authenticated before providing it with access tokens from access service 140. Such authentication may be based on a cryptographic certificate, or simply a password, for example. Where a more direct communication with access service is employed, base station 150, connection 156, controller 160, connection 167, gateway 170 and connection 174 are optional features.

Access controlled device 120 may also obtain access tokens from access service 140. In principle, access controlled device 120 may obtain the access tokens via connection 123, gateway 130 and connection 134, where a permanent data pathway is arranged or available to link access controlled device 120 with access service 140. However, in the absence of connection 123, gateway 130 and connection 134, in accordance with various embodiments of the present invention, access controlled device 120 may obtain access tokens from access service 140 using user devices, such as, for example, user device 110. Access controlled device 120 may lack a fixed connection to access service 140. Access controlled device 120 may lack a connection to access service 140 that would be independent of user devices.

To furnish access controlled device 120 with access tokens, for example lists of access tokens, via a user device, access service 140 may encrypt such access tokens using an encryption key configured in access controlled device 120 and access service 140. Such an encryption key may be referred to as a master encryption key, for example. Access service 140 may provide the encrypted access tokens to a user device, for example in connection with providing separate access tokens for the user device for use by the user device. Thereafter, when the user device accesses access controlled device 120, the user device may, in addition to accessing access controlled device 120 normally, provide the encrypted access tokens to access controlled device 120. Access controlled device 120 may then decrypt the access tokens, using the encryption key, and take them into use for subsequent accesses by user devices. The encryption used may be based on the advanced encryption standard, AES, for example.

Access service 140 may generate access tokens using a random or pseudorandom process. Access tokens may be generated using such a process, in principle, in unlimited amounts, in other words, access service 140 need never find itself in a situation where it has no access tokens to provide.

Access controlled device 120 and user device 110 may each select an access token to use in dependence of information, as described above. The information may originate in access controlled device 120, or be obtained from another source, such as, for example a satellite positioning signal clock signal. Selecting the access token to use may be achieved in separate ways.

Firstly, each access token in a list of access tokens may be associated with a validity time. For example, a first access token on the list may be valid on January $1^{st}$, while the second one will be valid on January $2^{nd}$, wherein when the second one is valid the first one will be expired, such that at any given time, the number of valid access tokens is low, for example exactly one. The validity time may be expressed as a date, as separate beginning and end times, or as a beginning or end time and an associated duration, for example. The information used in selecting an access token in this first scheme comprises an indication of a current time, which enables selecting the correct access token from the list in both access controlled device 120 and user device 110 when both access controlled device 120 and user device 110 use the same indication of current time.

Secondly, access controlled device 120 may be configured to use each access token a set number of times, for example once or ten times, after which the next access token in the list will be taken into use. In these embodiments, access controlled device 120 may provide in the information an indication as to which access token is currently in use, to enable user device 110 to select the corresponding access token. Such an indication may comprise, for example, a serial number of the access token in use. Where plural lists of access tokens are in use in access controlled device 120, access controlled device 120 may provide an indication as to which access token is in use in each of the lists. For example, the information provided by access controlled device 120 may comprise indications of the form {{list_A, access_token_i}, {list_B, access_token_j}}, or similar, to inform user devices concerning which access token on each list are in use. When the access token has been used the set number of times, access controlled device 120 may increment the access token number in the provided information, and cease accepting accesses using the previous access token. An advantage of this second scheme is that a clock is not needed to produce the indication of a current time of the first scheme, since the indication of a current time itself is not needed. On the other hand, it may be difficult to predict a rate at which access tokens are used up in this second scheme. A longer list of access tokens may be provided to guard against their depletion, for example. A variation of the indications of the type {list_A, access_token_i} is one where a single counter is maintained, instead of one counter per list. In this variation, the single counter is incremented each time an access token is used, regardless of which list the used access token is comprised in. An advantage of this variation is that access controlled device 120 may be constructed to a simpler specification since plural counters are not necessary. A further advantage of this variation is that the time to deplete an access token list is less sensitive to the distribution of accesses to the lists, increasing predictability.

Thirdly, access controlled device 120 may allow each access token in each list to be used for a set period of time. In this third scheme, access controlled device 120 may provide in the information an indication as to which access token is usable, for example for each list as in the second scheme. An advantage of the third scheme is that an absolute time is not needed, only a time period measured by access controlled device 120.

The first, second and third schemes may be used even at the same time, as user device 110 may be configured to select an access token in dependence of the information. Some access controlled devices may use the first scheme, while others may use the second or third scheme. User device 110 may be configured to react correctly to each type of information provided, to select a suitable access token. In case user device 110 has an access token list that is numbered, but access controlled device 120 provides an indication of a current time in the information, an error may be presented to a user, for example, for administrative corrective measures.

An access token may comprise, for example, a long term key, a connection signature resolving key and/or an identity resolving key, in accordance with Bluetooth specifications. In other implementations, cryptographic information of another kind may be comprised in access tokens.

In case an access controlled device 120 is rendered in a condition where it has no valid access tokens, a master access token may be used to enable an administrator to access the access controlled device 120 to provide it with access tokens. Access tokens may run out, for example, where the access tokens have validity times defined in absolute time, as in the first scheme, and the validity period of the last access token in the list ends without new access tokens being provided. Alternatively, an internal clock of an access controlled device may be reset or changed to a value outside the validity times of the available access tokens. In such a case, an administrator may access the access controlled device using the master access token and his own user device, to provide new access tokens and/or set the internal clock of access controlled device 120. Such new access tokens, again, may originate in access service 140. In some embodiments, the master access token is changed each time it is used.

Overall, an advantage may be obtained, separately and/or in combination, from each of the first, second and third schemes in that access controlled devices need not have a connection of their own to access service 140 to obtain access tokens.

Figure 2:
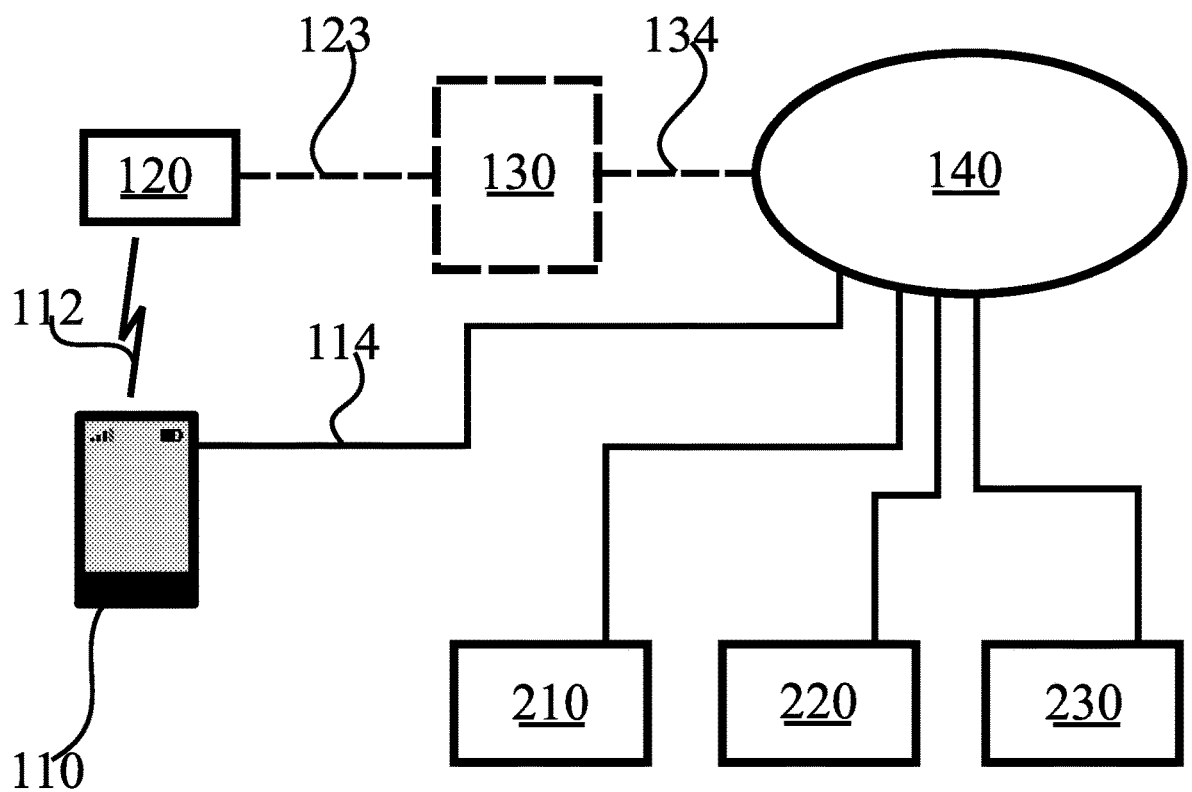
FIG. 2 illustrates a system in accordance with at least some embodiments of the present invention.

FIG. 2 illustrates a system in accordance with at least some embodiments of the present invention. In FIG. 2, like numbering denotes like structure as in FIG. 1. In FIG. 2, the connection between user device 110 and access service 140 is denoted schematically with connection 114.

The system of FIG. 2 comprises an application management function 210, which may be usable in managing applications running on user devices. Such applications may be usable, for example, in generating access requests to access controlled devices 120 and generating a user interface to enable a user to interact with information in access controlled device 120. Managing applications may comprise, for example, providing software updates that affect the applications.

The system of FIG. 2 further comprises a user device database 220. Database 220 may comprise information associating specific user devices with access levels to various access controlled devices. Database 220 may be consulted by access service 140 when providing access tokens to user devices, to enable providing access tokens of a correct type, for example.

The system of FIG. 2 further comprises a database 230 storing domain specific algorithms for analysing data. Such algorithms may enable visualizations, predict conditions and/or provide recommendations and personalized notifications.

Figure 3:
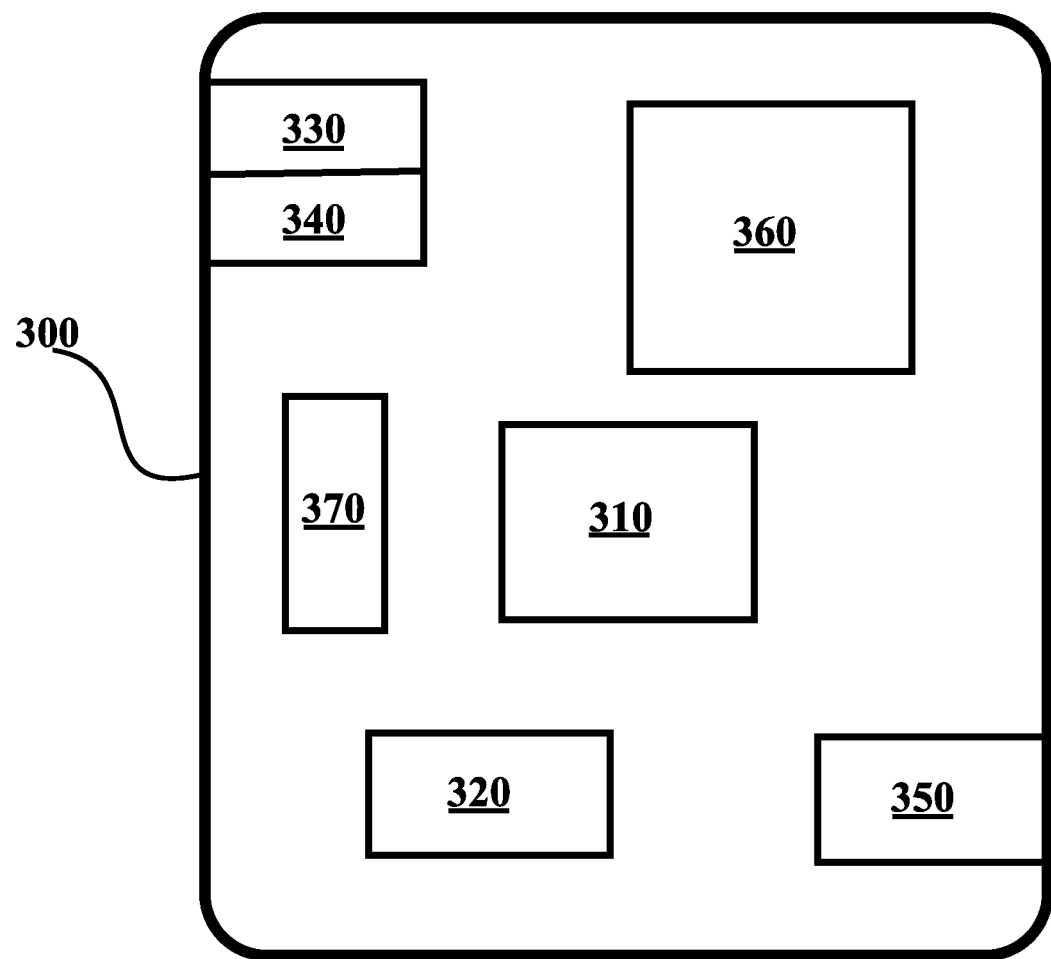
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a user device 110 or access controlled device 120 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example seek access to an access controlled device.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further components not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
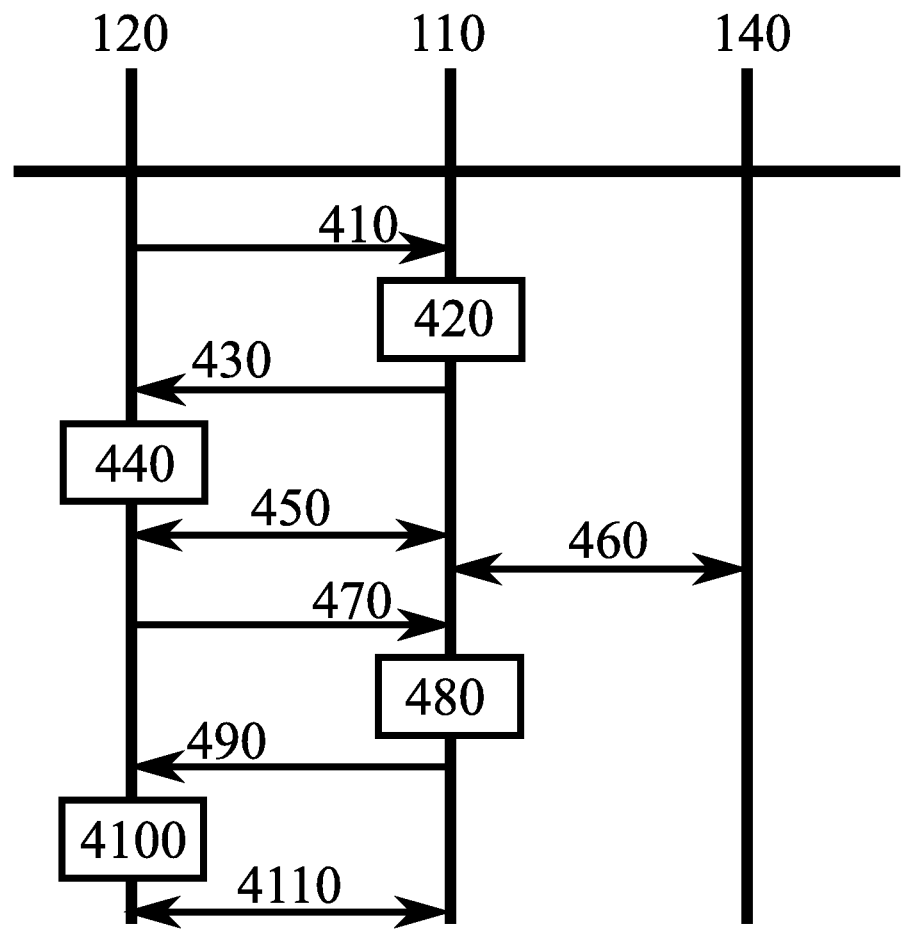
FIG. 4 illustrates signalling in accordance with at least some embodiments of the present invention.

FIG. 4 illustrates signalling in accordance with at least some embodiments of the present invention. On the vertical axes are disposed, from left to right, access controlled device 120, user device 110 and, finally, access service 140. Time advances from the top toward the bottom.

In phase 410, access controlled device 120 provides information to user device 110, for example by broadcasting or responsive to a request. In phase 420, user device 120 selects, based at least partly on the information received in phase 410, an access token, for example from a list. The selecting may be further based on an identity of access controlled device 120 and/or a role a user of user device 110 wants to assume with respect to access controlled device 120.

In phase 430, user device 110 requests for access to access controlled device 120. This phase may comprise setting the user devices' address to be a resolvable private address generated using an identity resolving key obtained from the selected access token. A resolvable private address may comprise a random component, which makes an outsider's attempt to determine a role of user device 110 more difficult.

In phase 440, access controlled device 120 verifies the access credential presented by user device 110 is correct. If the credential presented by user device 110 is incorrect, access controlled device 120 may refuse access. Access controlled device 120 also selects an access token, which may correspond to a role user device 110 seeks with respect to access controlled device 120. The selection of access token in access controlled device 120 may also depend on the information communicated in phase 410. In phase 450, a connection is present between access controlled device 120 and user device 110. Such connection may be protected with cryptographic methods and be based, at least partly, on contents of the selected access tokens.

In phase 460, user device 110 communicates with access service 140. During this communication, user device 110 may be authenticated and presented with new access tokens, for example, new access token lists, each provided list corresponding to a role user device 110 can assume with respect to an access controlled device. Separate access token lists may be provided for distinct access controlled devices. Furthermore, in phase 460 user device 110 may be provided encrypted access token lists to be conveyed to at least one access controlled device. Such encrypted access token lists may comprise access token lists for each role that user devices can assume with respect to the access controlled device concerned.

In phase 470, as in phase 410, access controlled device 120 provides information to user device 110, for example by broadcasting. Subsequently in phases 480, 490 and 4100, as in corresponding phases 420, 430 and 440 user device 110 is authenticated toward access controlled device 120.

In phase 4110, a connection is present between access controlled device 120 and user device 110. User device 110 may access access controlled device 120, and access controlled device 120 may obtain the encrypted access token list or lists from user device 110. Access controlled device 120 may then decrypt the access token list or lists, to maintain a fresh store of access tokens.

Figure 5:
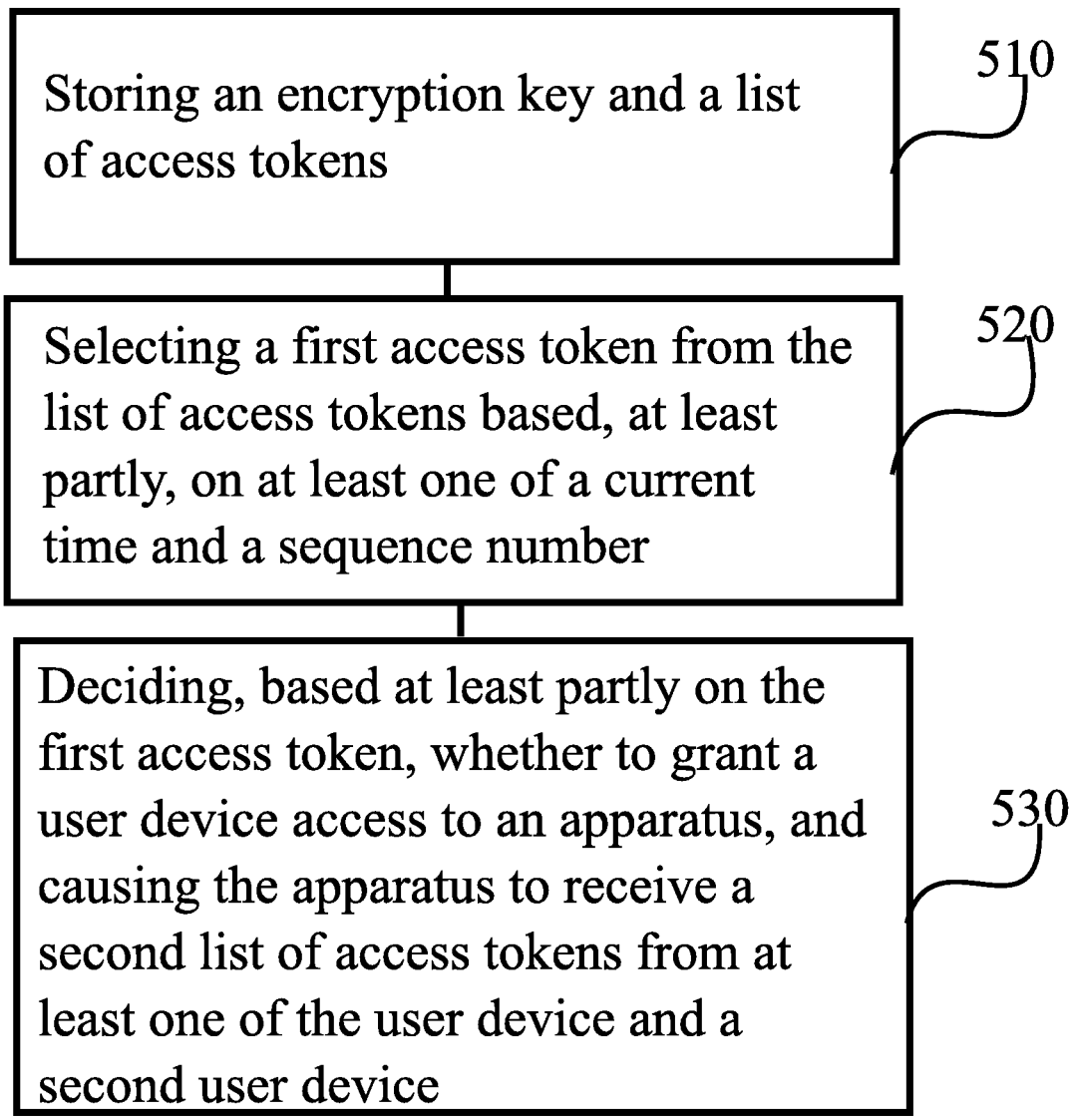
FIG. 5 is a first flow graph of a first method in accordance with at least some embodiments of the present invention.

FIG. 5 is a first flow graph of a first method in accordance with at least some embodiments of the present invention. The illustrated method may be performed in an access controlled device, for example, or in a control device configured to control the functioning of an access controlled device, when implanted therein.

Phase 510 comprises storing an encryption key and a list of access tokens. Phase 520 comprises selecting a first access token from the list of access tokens based, at least partly, on at least one of a current time and a sequence number. Phase 530 comprises deciding, based at least partly on the first access token, whether to grant a user device access to an apparatus, and causing the apparatus to receive a second list of access tokens from at least one of the user device and a second user device.

Figure 6:
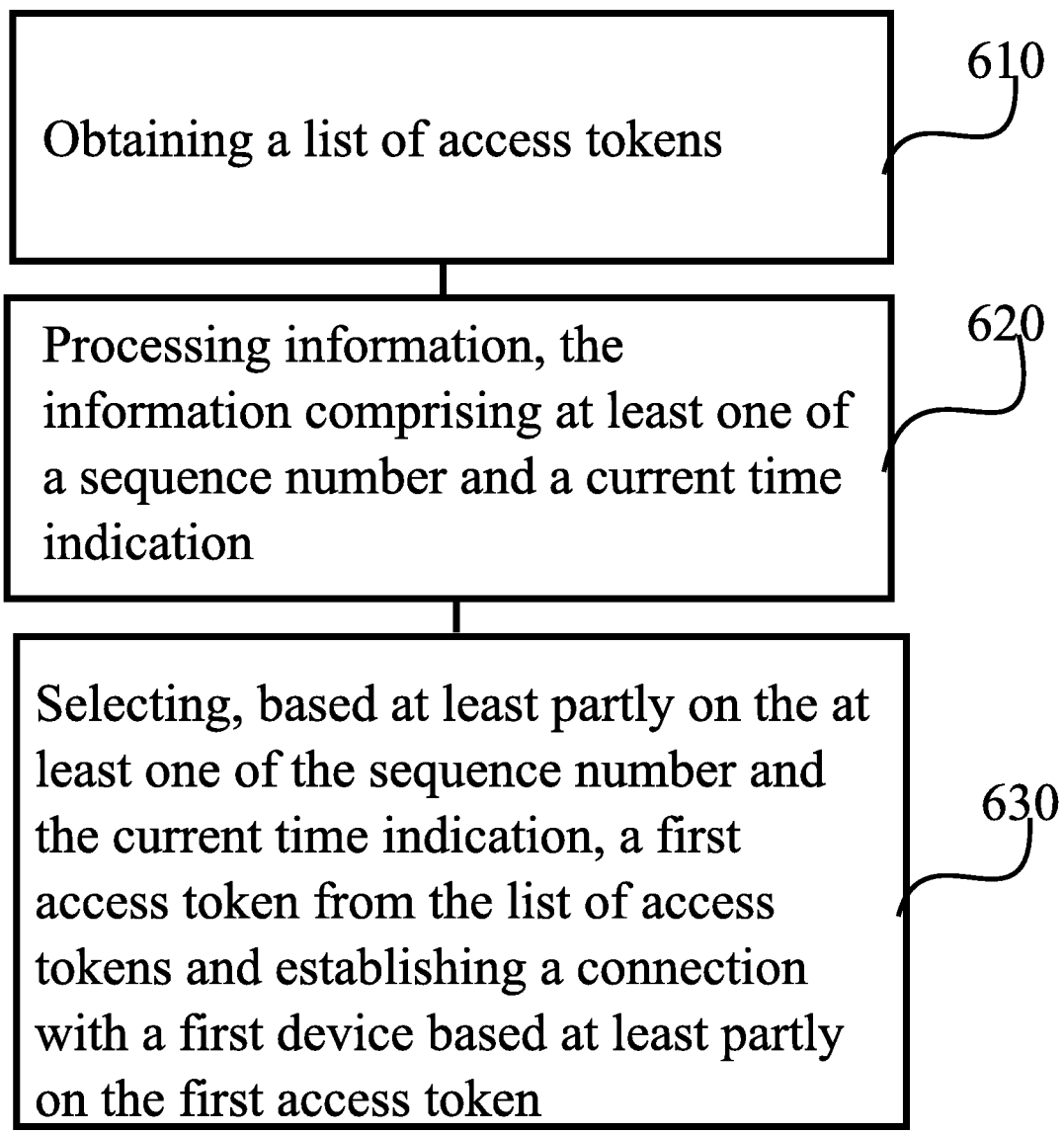
FIG. 6 is a second flow graph of a second method in accordance with at least some embodiments of the present invention.

FIG. 6 is a second flow graph of a second method in accordance with at least some embodiments of the present invention. The illustrated method may be performed in a user device, for example, or in a control device configured to control the functioning of a user device, when implanted therein.

Phase 610 comprises obtaining a list of access tokens. Phase 620 comprises processing information, the information comprising at least one of a sequence number and a current time indication. Phase 630 comprises selecting, based at least partly on the at least one of the sequence number and the current time indication, a first access token from the list of access tokens and establishing a connection with a first device based at least partly on the first access token. The information may originate in the first device. The information may comprise a broadcasted message. The broadcasted message may comprise an advertisement. The method may further comprise obtaining a second list of access tokens, and providing the second list of access tokens to the first device. The second list of access tokens may comprise a plurality of lists of access tokens. The second list of access tokens may be encrypted with an encryption key the apparatus performing the method of FIG. 6 does not possess. The second list of access tokens may be obtained from an access service.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing access controlled devices, to increase security.

Acronyms List

AES advanced encryption standard
IoT Internet of Things
LTE long term evolution
NFC near-field communication
USB universal serial bus
WCDMA wideband code division multiple access
WiMAX worldwide interoperability for microwave access
WLAN wireless local area network

| REFERENCE SIGNS LIST | |
|---|---|
| 110 | User device |
| 120 | Access controlled device |
| 130 | Gateway |
| 140 | Access Service |
| 150 | Base station |
| 160 | Controller |
| 170 | Gateway |
| 210 | Application management function |
| 220 | User device database |
| 230 | Database storing domain specific algorithms |
| 300-370 | Structure of the device of FIG. 3 |
| 410-4110 | Phases of the method of FIG. 4 |
| 510-530 | Phases of the method of FIG. 5 |
| 610-640 | Phases of the method of FIG. 6 |

The invention claimed is:

1. An apparatus comprising:
   at least one processing core, and
   at least one memory including computer program code,
   the at least one memory and the computer program code being configured to, with the at least one processing core, cause the apparatus at least to:
   select a first access token from a list of access tokens, stored in the apparatus, each access token comprising cryptographic information, the selecting of the first access token being based, at least partly, on at least one of a current time and a sequence number indicating a sequence of access tokens in the list;
   decide, based at least partly on the first access token, whether to grant a user device access to the apparatus, the user device being distinct from the apparatus;
   cause the apparatus to receive a second list of access tokens from a second user device and use the second list of access tokens in deciding on granting access to the apparatus to user devices other than the second user device, and
   store a plurality of lists of access tokens, each list of access tokens comprising access tokens that are usable in obtaining a different level of access to the apparatus, the second list comprising a second plurality of lists of access tokens.

2. The apparatus according to claim 1, wherein the at least one processing core is further configured, with the least one memory including computer program code, to cause the apparatus to receive the second list of access tokens over a short-range wireless interface.

3. The apparatus according to claim 2, wherein the short-range wireless interface comprises a short-range radio interface.

4. The apparatus according to claim 1, wherein each list corresponds to a distinct role a user may assume with respect to the apparatus.

5. The apparatus according to claim 1, wherein the at least one processing core is further configured to select the first access token based at least partly on the current time, wherein each access token is associated with a validity time interval.

6. The apparatus according to claim 1, wherein the at least one processing core is further configured, with the at least one memory including computer program code, to select the first access token based at least partly on the sequence number by allowing each access token to be used a set number of times.

7. The apparatus according to claim 1, wherein the at least one processing core is further configured, with the at least one memory including computer program code, to select the first access token based at least partly on the sequence number, wherein each access token is enabled for a preconfigured time duration, after which the sequence number used is incremented.

8. The apparatus according to claim 1, wherein the at least one processing core is further configured, with the at least one memory including computer program code, to cause the apparatus to advertise at least one of the current time and the sequence number.

9. The apparatus according to claim 1, wherein the at least one processing core is further configured, with the at least one memory including computer program code, to cause the apparatus to decrypt the second list of the access tokens, using an encryption key stored in the apparatus, and to authenticate the second list of the access tokens based at least partly based on a result of the decrypting.

10. An apparatus comprising at least one processing core, at least one memory including computer program code, the at least one memory and the computer program code being configured to, with the at least one processing core, cause the apparatus at least to:
    obtain a list of access tokens, each access token comprising cryptographic information;
    process information, the information comprising at least one of a sequence number and a current time indication;
    select, based at least partly on the at least one of the sequence number and the current time indication, a first access token from the list of the access tokens and establish a connection with a first device based at least partly on the first access token, the first device being an access controlled device or a controller of the access controlled device, and obtaining, in the apparatus, a second list of access tokens, the second list comprising a plurality of lists of access tokens, each list of access tokens comprising access tokens that are usable in obtaining a different level of access to the first device, and providing the second list of access tokens to the first device to use in deciding on granting access to the first device to user devices other than the apparatus, the apparatus comprising a user device which is distinct from the first device.

11. The apparatus according to claim 10, wherein the at least one memory and the computer program code are further configured to, with the at least one processing core, cause the apparatus to select the first access token based at least partly on the current time, wherein each access token is associated with a validity time interval.

12. The apparatus according to claim 10, wherein the at least one memory and the computer program code are further configured to, with the at least one processing core, cause the apparatus to select the first access token based at least partly on the sequence number, each access token being allowed to be used a set number of times.

13. The apparatus according to claim 10, wherein the at least one memory and the computer program code are further configured to, with the at least one processing core, cause the apparatus to select the first access token based at least partly on the sequence number, wherein each access token is enabled for a preconfigured time duration, after which the sequence number used is incremented.

14. A method comprising:

storing, in an apparatus, an encryption key and a list of access tokens, each access token comprising cryptographic information;

selecting a first access token from the list of the access tokens based, at least partly, on at least one of a current time and a sequence number indicating a sequence of access tokens in the list;

deciding, based at least partly on the first access token, whether to grant a user device access to an apparatus, the user device being distinct from the apparatus, and causing the apparatus to receive a second list of access tokens from at least one of the user a second user device and using the second list of access tokens in deciding on granting access to the apparatus to user devices other than the second user device, wherein the storing comprises storing a plurality of lists of access tokens, each list of access tokens comprising access tokens that are usable in obtaining a different level of access to the apparatus, the second list comprising a second plurality of lists of access tokens.

15. The method according to claim 14, comprising receiving the second list of the access tokens over a short-range wireless interface.

16. The method according to claim 15, wherein the short-range wireless interface comprises a short-range radio interface.

17. The method according to claim 14, wherein each list corresponds to a distinct role a user may assume with respect to the apparatus.

\* \* \* \* \*